United States Patent
Prasse

(10) Patent No.: US 11,674,000 B2
(45) Date of Patent: Jun. 13, 2023

(54) PROCESS FOR PREPARING BRANCHED ORGANOPOLYSILOXANES

(71) Applicant: WACKER CHEMIE AG, Munich (DE)

(72) Inventor: Marko Prasse, Glaubitz (DE)

(73) Assignee: WACKER CHEMIE AG, Munich (DE)

( * ) Notice: Subject to any disclaimer, the term of this patent is extended or adjusted under 35 U.S.C. 154(b) by 80 days.

(21) Appl. No.: 17/268,709

(22) PCT Filed: Aug. 24, 2018

(86) PCT No.: PCT/EP2018/072903
§ 371 (c)(1),
(2) Date: Feb. 16, 2021

(87) PCT Pub. No.: WO2020/038588
PCT Pub. Date: Feb. 27, 2020

(65) Prior Publication Data
US 2021/0171716 A1   Jun. 10, 2021

(51) Int. Cl.
*C08G 77/08* (2006.01)
*C08G 77/16* (2006.01)
*C08G 77/00* (2006.01)

(52) U.S. Cl.
CPC ............ *C08G 77/08* (2013.01); *C08G 77/16* (2013.01); *C08G 77/80* (2013.01)

(58) Field of Classification Search
CPC ................................ C08G 77/10; C08G 77/08
See application file for complete search history.

(56) References Cited

U.S. PATENT DOCUMENTS

| | | | | |
|---|---|---|---|---|
| 4,929,691 A | * | 5/1990 | Fillmore | C08G 77/18 556/467 |
| 4,929,703 A | * | 5/1990 | Narula | C09D 183/04 528/33 |
| 5,300,607 A | * | 4/1994 | Nakanishi | C08G 77/10 528/14 |
| 5,300,610 A | * | 4/1994 | Nakanishi | C08G 77/06 528/34 |
| 5,336,715 A | | 8/1994 | Sejpka et al. | |
| 5,391,674 A | * | 2/1995 | Hara | C08G 77/06 528/21 |
| 5,538,547 A | | 7/1996 | Gerhardinger et al. | |
| 6,417,310 B1 | * | 7/2002 | Omura | C08G 77/06 528/21 |
| 2003/0050420 A1 | | 3/2003 | Pickering et al. | |
| 2004/0158018 A1 | * | 8/2004 | Kobayahi | C08G 77/18 528/10 |
| 2017/0321015 A1 | | 11/2017 | Ackermann et al. | |
| 2017/0355804 A1 | * | 12/2017 | Fujisawa | C08K 5/14 |

FOREIGN PATENT DOCUMENTS

| | | |
|---|---|---|
| CN | 106750312 A | 5/2017 |
| DE | 10227590 A1 | 11/2002 |
| EP | 0850998 B1 | 4/2004 |
| EP | 2619247 A1 | 7/2013 |
| EP | 2619249 B1 | 5/2014 |
| EP | 2619246 B1 | 7/2014 |
| EP | 2619248 B1 | 8/2014 |
| EP | 2791263 B1 | 8/2016 |
| EP | 2619245 B1 | 7/2017 |
| JP | 6001919 A | 1/1994 |
| JP | 7150131 A | 6/1995 |
| JP | 2018503579 A | 2/2018 |
| KR | 1020040030717 A | 4/2004 |
| WO | 2003002634 A2 | 1/2003 |

* cited by examiner

*Primary Examiner* — Margaret G Moore
(74) *Attorney, Agent, or Firm* — Brooks Kushman P.C.

(57) ABSTRACT

Branched organopolysiloxanes are prepared from alkoxysilanes and polydiorganosiloxanes over two stages by basic equilibration and subsequent acid-catalyzed reaction with water to the desired degree of condensation, wherein the entire process does not require the use of additional organic solvent, no wastewater is generated and the process is particularly suitable for the controlled production of so-called DT resins.

10 Claims, No Drawings

PROCESS FOR PREPARING BRANCHED ORGANOPOLYSILOXANES

CROSS REFERENCE TO RELATED APPLICATIONS

This application is the U.S. National Phase of PCT Appln. No. PCT/EP2018/072903 filed Aug. 24, 2018, the disclosure of which is incorporated in its entirety by reference herein.

BACKGROUND OF THE INVENTION

1. Field of the Invention

The invention relates to a process for producing branched organopolysiloxanes from alkoxysilanes and polydiorganosiloxanes over two stages by basic equilibration and subsequent acid-catalyzed reaction with water.

2. Description of the Related Art

Processes for producing branched organopolysiloxanes have long been known in the prior art. In EP 0 850 998 B1, a silicone resin or hydrolyzable precursor thereof is reacted with linear siloxanes in a one-stage process in a solvent. Condensation catalysts, inter alia, are specified as catalysts which, although less preferred, may also be strong acids or bases.

EP 2 619 249 B1, EP 2 619 248 B1, EP 2 619 247 A1, EP 2 619 246 B1 and EP 2 619 245 B1 describe the production of so-called DT resins having a block copolymer structure of endcapped linear organosiloxanes and organosiloxane resins in an organic solvent. The block copolymer has an average weight of at least 20,000 g/mol.

Likewise in EP 2 791 263 B1, DT resins are produced having a block copolymer structure of endcapped linear organosiloxanes, organosiloxane resins and in an organic solvent, wherein these DT resins are cured with the aid of strong organic bases.

SUMMARY OF THE INVENTION

The invention relates to a process for producing branched organopolysiloxanes, wherein in a first step at least one alkoxysilane is equilibrated with at least one polydiorganosiloxane in the presence of a basic catalyst, optionally mixed with alcohol and in a second step the equilibrate obtained in the first step is hydrolyzed and condensed with water and optionally other organosilicon compounds in the presence of an acidic catalyst and optionally alcohol, with the proviso that, in the second step hydrocarbons are present in amounts of not more than 1% by weight, based on the amount of equilibrate.

DETAILED DESCRIPTION OF THE PREFERRED EMBODIMENTS

The hydrocarbons, which may be present in the second process step up to not more than 1% by weight, are preferably linear or branched hydrocarbons, which may be present as impurities in the alkoxysilanes and/or polydiorganosiloxanes used.

In the context of the present invention, the term organopolysiloxanes is intended to include both polymers, oligomers and also dimeric siloxanes.

Preferably, in the process according to the invention, branched organopolysiloxanes comprising units of the formula $$R_a Si (OR^1)_b O_{(4-a-b)/2} \qquad (I)$$

are obtained, where

R may be the same or different and is a monovalent or bivalent, SiC-bonded, optionally substituted hydrocarbon radical, $R^1$ may be the same or different and is a hydrogen atom or hydrocarbon radicals having 1 to 4 carbon atoms, a is 0, 1, 2 or 3 and b is 0, 1, 2 or 3, with the proviso that the sum of a+b≤3, a has the value 1 in 20 to 90%, preferably in 30 to 90%, more preferably in 40 to 90%, of all units of the formula (I), a has the value 2 in 10 to 60% of all units of the formula (I), a has the value 3 in at most 10%, preferably in at most 8%, more preferably in at most 6%, of all units of the formula (I), a has the value 0 in at most 10%, preferably in at most 8%, more preferably in at most 6%, of all units of the formula (I) and b has the value 0 in 50 to 95%, preferably in 60 to 95%, more preferably in 70 to 95%, of all units of the formula (I).

Examples of monovalent hydrocarbon radicals R are alkyl radicals such as the methyl, ethyl, n-propyl, isopropyl, n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical, cycloalkyl radicals such as cyclopentyl, cyclohexyl, cycloheptyl and methylcyclohexyl radicals, aryl radicals such as the phenyl, naphthyl, anthryl and phenanthryl radicals, alkaryl radicals such as tolyl radicals, xylyl radicals and ethylphenyl radicals, arylalkyl radicals such as the benzyl radical and the β-phenylethyl radical and alkenyl radicals such as the vinyl, allyl, and cyclohexenylethyl radicals.

Examples of divalent hydrocarbon radicals R are alkylene radicals such as the ethylene radical, or ethenylene radical or the phenylene radical, which can bond two units of the formula (I) and/or of the formula (II) with each other.

Examples of substituted hydrocarbon radicals R are 3-methacryloxypropyl, methacryloxymethyl, 2-imino-3-carbonyl-4-oxapentyl, and 4-imino-5-carbonyl-6-oxaheptyl radicals.

The radicals R are preferably acid-stable hydrocarbon radicals having 1 to 18 carbon atoms optionally substituted with heteroatoms, preferably hydrocarbon radicals having 1 to 18 carbon atoms, especially the methyl, vinyl, propyl, 2,2,4-trimethylpentyl, or phenyl radicals.

Preferably, the radicals $R^1$ are methyl or ethyl radicals.

The alkoxysilanes used in accordance with the invention are preferably those of the formula $$R_n Si(OR^1)_{4-n} \qquad (II),$$

where

R and $R^1$ have the definition specified above and n is 0 or 1, preferably 1.

Examples of alkoxysilanes of the formula (II) used in accordance with the invention are methyltrimethoxysilane, methyltriethoxysilane, phenyltrimethoxysilane, phenyltriethoxysilane, vinyltrimethoxysilane, vinyltriethoxysilane, 2,2,4-trimethylpentyltrimethoxysilane, 2,2,4-trimethylpentyltriethoxysilane, n-propyltrimethoxysilane, n-propyltriethoxysilane, n-hexadecyltrimethoxysilane, bis(triethoxysilyl)ethane, tetramethoxysilane, tetraethoxysilane and 3-(methacryloxypropyl)trimethoxysilane, methacryloxymethyltrimethoxysilane, N-[3-(trimethoxysilyl)propyl]-O-methylcarbamate, and N-trimethoxysilylmethyl-O-methylcarbamate, preference being given to methyltrimethoxysilane, methyltriethoxysilane, phenyltrimethoxysilane, phenyltriethoxysilane, vinyltrimethoxysilane, vinyltriethoxysilane, n-propyltrimethoxysilane, n-propyltriethoxysilane, 2,2,4-trimethylpentyltrimethoxysilane or 2,2,4-trimethylpentyltriethoxysilane.

In the first step of the process according to the invention, the silanes of the formula (II) can be used both as pure silanes and as a mixture of different silanes of the formula (II).

The polydiorganosiloxanes used in accordance with the invention are preferably linear or cyclic siloxanes consisting of units of the formula

$$R_c(OR^2)_d SiO_{4-c-d/2} \quad (III),$$

where
R has the definition specified above,
$R^2$ may be the same or different and is a hydrogen atom or a hydrocarbon radical having 1 to 4 carbon atoms,
c is equal to 2 or 3 and
d is equal to 0 or 1,
with the proviso that the sum of c+d≤3 and c has the value 2 in at least 50%, preferably in at least 70%, particularly preferably in at least 90%, of all units of the formula (I).

The radicals $R^2$ are preferably hydrogen atoms.

Examples of polydiorganosiloxanes used in accordance with the invention are $(HO)Me_2SiO[SiMe_2O]_{10-1000}SiMe_2(OH)$, $Me_3SiO[SiMe_2O]_{0-1000}SiMe_3$, $Me_3SiO[SiMe_2O]_{3-1000}SiMe_2(OH)$, $ViMe_2SiO[SiMe_2O]_{30-1000}SiMe_2Vi$, $Me_3SiO[SiPhMeO]_{1-100}[SiMe_2O]_{0-500}SiMe_3$, $Me_3SiO[SiPh_2O]_{1-100}[SiMe_2O]_{0-500}SiMe_3$, $Me_3SiO[SiViMeO]_{1-100}[SiMe_2O]_{0-500}SiMe_3$, cyclo-$[SiMe_2O]_{3-20}$, cyclo-$[SiPh_2O]_{3-10}$, cyclo-$[SiViMeO]_{3-10}$ and mixtures thereof, where preference is given to $(HO)Me_2SiO[SiMe_2O]_{10-1000}SiMe_2(OH)$, $Me_3SiO[SiMe_2O]_{0-1000}SiMe_3$, $Me_3SiO[SiMe_2O]_{3-1000}SiMe_2(OH)$, cyclo-$[SiMe_2O]_{3-20}$ or mixtures thereof, where Me is a methyl radical, Vi is a vinyl radical and Ph is a phenyl radical.

In all formulae of the present invention disclosure, the symbols have their definitions independently of one another. The silicon atom is always tetravalent.

The ratios by amount and the type of the silanes of the formula (II) and siloxanes composed of units of the formula (III) used in the process according to the invention are primarily based on the desired proportion of branchings and chain lengths of the target product.

In the process according to the invention, preferably 9 to 0.4 mol, more preferably 9 to 1 mol, and most preferably 9 to 1.5 mol of silanes of the formula (II) are used per mole of silicon atoms in the organopolysiloxanes composed of units of the formula (III).

When carrying out the equilibration according to the invention, all known basic catalysts promoting the equilibration reactions can be used.

Examples of basic equilibration catalysts are alkali metal hydroxides such as lithium hydroxide, sodium hydroxide and potassium hydroxide, alkali metal alkoxides such as sodium methoxide and sodium ethoxide, alkali metal carbonates such as sodium carbonate, potassium carbonate and cesium carbonate, alkali metal organic compounds such as butyllithium, alkaline earth metal hydroxides such as calcium hydroxide or barium hydroxide, phosphonium hydroxides such as tetrabutylphosphonium hydroxide, ammonium hydroxides such as benzyltrimethylammonium hydroxide and tetramethylammonium hydroxide, silanolates such as dipotassium polydimethylsiloxanolate, bis(tetramethylammonium) polydimethylsiloxanolate and bis(tetrabutylphosphonium) polydimethylsiloxanolate and alkali metal compounds which can form alkali metal hydroxides or alkali metal silanolates under the conditions of use such as alkali metals, alkali metal hydrides, alkali metal oxides, alkali metal peroxides or alkali metal amides, preference being given to alkali metal hydroxides such as potassium hydroxide, alkali metal alkoxides such as sodium methoxide and sodium ethoxide, alkali metal carbonates such as cesium carbonate, and also ammonium hydroxides such as benzyltrimethylammonium hydroxide and tetramethylammonium hydroxide.

In the process according to the invention, preference is given to using basic catalysts in amounts from 50 to 5,000 ppm by weight, particularly preferably 100 to 2,500 ppm by weight, based in each case on the total weight of silanes of the formula (II) and organopolysiloxanes composed of units of the formula (III).

The alcohols which may optionally be used in the process according to the invention are preferably those hydrocarbon compounds having an alcoholic hydroxyl group, which may be used for producing alkoxysilanes or for producing organopolysiloxanes by reacting chlorosilane with alcohols and optionally water, and the boiling point of which is in each case below that of the alkoxysilane or organopolysiloxane to be produced.

Preferably, the alcohols optionally used in the process according to the invention are alkanols having 1 to 6 carbon atoms or ether oxygen-substituted alkanols having 1 to 6 carbon atoms, such as methanol, ethanol, n-propanol or isopropanol, beta-methoxyethanol, n-butanol or n-hexanol, particular preference being given to methanol, ethanol, isopropanol or butanol, especially methanol or ethanol, wherein denaturants customary in ethanol, such as methyl ethyl ketone, petroleum ether or cyclohexane, may be present. Mixtures of different alcohols can also be used, which can optionally be homogenized in a short mixing section prior to feeding to the respective reaction unit.

In the first step of the process according to the invention, alcohol is preferably used in amounts from 0 to 20% by weight, more preferably 0 to 10% by weight, and especially 0 to 5% by weight, based in each case on the total weight of silanes of the formula (II) and organopolysiloxanes composed of units of the formula (III). If alcohol is used in the first process step, it is preferably used as the solvent for the basic catalyst and/or an impurity in the silanes used.

In the first step of the process according to the invention, other than alkoxysilane, polydiorganosiloxane, basic catalyst and optionally alcohol and impurities thereof, preferably no other components are added.

The impurities which may be present in the components used in the first process step according to the invention are, for example, denaturants such as the aforementioned, or are chlorohydrocarbons. Typical amounts of such impurities are in the range from 1 to 10,000 ppm by weight, based on the reaction mixture in the first process step.

The first step of the process according to the invention is preferably carried out at a temperature from 10 to 150° C., more preferably at 20 to 145° C., and especially at 30 to 90° C., and at a pressure of the surrounding atmosphere, i.e.

approximately between 900 and 1100 hPa. If desired, however, higher or lower pressures can also be applied.

The first step of the process according to the invention is preferably carried out for a duration of 5 to 120 min, more preferably 10 to 100 min, and especially 15 to 90 min. The duration depends on the catalyst used, the amount of catalyst, the reaction temperature and the degree of equilibration desired and can be adapted depending on the procedure. In the case of continuous production, shorter times are advisable, while in discontinous production longer times are advisable for better reproducibility.

After successful equilibration, the reaction mixture is preferably immediately further processed in a second step. The reaction mixture can also however be neutralized by means of an acid, preferably to a base or acid content of below 50 ppm by weight, can be temporarily stored in this state, optionally devolatilized and/or filtered, and then after a desired time period, the second process step can be carried out.

In the case of optionally carrying out devolatilization, the reaction mixture obtained is freed of volatile constituents such as alcohols and silanes by maintaining the mixture at temperatures of preferably 50 to 200° C. and a pressure of preferably 10 to 1100 hPa. The volatile constituents thus removed can be reused.

The viscosity of the isolated devolatilized equilibrate obtained in the first step of the process according to the invention is preferably 2 to 100 mPas, more preferably 3 to 50 mPas, and especially 4 to 25 mPas, in each case at 25° C.

The content of $OR^1$ groups of the equilibrate obtained in the first step of the process according to the invention is at least 20% by weight, particularly preferably at least 22% by weight, especially at least 25% by weight, where $R^1$ has one of the definitions specified above.

The reaction mixture or the isolated equilibrate obtained according to the first step is then made acidic in a subsequent second step by addition of an acidic catalyst and reacted with water and optionally further alkoxy- and/or hydroxy-functional organosilicon compounds, optionally in the presence of alcohol.

Examples of acidic catalysts used in accordance with the invention are inorganic acids such as hydrochloric acid, hydrofluoric acid, sulfuric acid, nitric acid, perchloric acid or phosphoric acid, sulfonic acids such as trifluoromethanesulfonic acid, fluorosulfonic acid or methylsulfonic acid, phosphoric acids such as vinylphosphonic acid or n-octylphosphonic acid, organic acids such as trifluoroacetic acid, formic acid, oxalic acid or n-octanoic acid, and also compounds which, under the conditions of use, i.e. in the presence of water and alcohols, can form acids, such as chlorides such as, for example, isooctyltrichlorosilane, dichlorodimethylsilane, tetrachlorosilane, phosphorus oxychloride, acetyl chloride, n-octoyl chloride or boron trichloride, fluorides such as boron trifluoride complexes, nonmetal oxides such as sulfur trioxide and anhydrides such as acetic anhydride, pyrosulfuric acid and pyrophosphoric acid, particular preference being given to hydrochloric acid, sulfuric acid, nitric acid or methylsulfonic acid.

The acidic catalysts used in accordance with the invention are used in amounts such that, after neutralization of the basic catalyst, an excess of the acidic catalyst in amounts of 50 to 5,000 ppm by weight, more preferably 100 to 2,500 ppm by weight results, based in each case on the total weight of the equilibrate used.

Preferably, the water used in the second step of the process according to the invention is partially demineralized water, fully demineralized water, distilled or (multiply) redistilled water or water for medicinal or pharmaceutical purposes, most preferably partially demineralized water or fully demineralized water.

Preferably, the water used in accordance with the invention has a conductivity at 25° C. and 1010 hPa of at most 50 µS/cm. The water used in accordance with the invention is preferably saturated with air, clear and colorless.

In the second step in the process according to the invention, water is preferably used in amounts of 0.3 mol to 0.6 mol, based on 1 mol of alkoxy groups of the alkoxysilanes of the formula (II) used.

The water is preferably added in full at the start of the second step, preferably after addition of the acidic catalyst. The water can also be added as a mixture with the acidic catalyst. The water is preferably added stepwise or continuously over the course of 1 to 15 min with intense stirring, such that the water is initially finely distributed and thus hydrolyzes the alkoxy groups and then, as the process continues, the alcohol formed ensures a homogeneous distribution of the added water, and also the heat of reaction can be dissipated, for example by reflux cooling.

Examples of the alcohols optionally used in the second step of the process according to the invention are the examples mentioned for the alcohols which can be used in the first step.

If alcohol is used in both steps of the process according to the invention, the same alcohol is preferably used in all steps, preferably methanol or ethanol. Alcohol is preferably only used in the first step as solvent for the basic catalyst.

Alcohol is formed in the second step during hydrolysis of the alkoxy groups and preferably no additional alcohol is added. If alcohol is used in the first and/or second step of the process according to the invention, it is preferably the same alcohol that is formed in the hydrolysis in the second step.

In the second step of the process according to the invention, preferably no hydrocarbons are used.

To improve mixing, the water can be mixed with alcohol, the alcohol used preferably being the alcohol that is formed during hydrolysis, and/or the reaction mixture is heated to temperatures of 1 to 20° C. below the boiling point of the alcohol formed. At the start of the water addition, the reaction mixture can be biphasic, i.e. cloudy. In the further course of the water addition and the acidic condensation in the second step, the reaction mixture is monophasic, i.e. homogeneous. At very high degrees of condensation, the mixture can again become cloudy due to precipitation of highly-condensed silicone resins from the alcoholic solution, but this is not preferred.

In the second step of the process according to the invention, apart from equilibrate, water, optionally further organosilicon compounds, acidic catalyst and optionally alcohol, preferably no further components are added.

In a preferred embodiment of the process according to the invention (process variant a), no further organosilicon compounds are used in the second reaction step, and the reaction with water is carried out to the desired condensation stage, whereby highly-condensed, branched organopolysiloxanes are preferably formed as end product.

In a further preferred embodiment of the process according to the invention (process variant b), further organosilicon compounds are used in the second step, which then react with water and the equilibrate.

The organosilicon compounds used in process variant b according to the invention can be silanes of the formula (II) and/or siloxanes composed of units of the formula (III), which in this case are preferably short-chain organopolysiloxanes having at most 10 units of the formula (III), particular preference being given to hexamethyldisiloxane.

The organosilicon compounds used in process variant b according to the invention are preferably used in amounts from 1 to 10% by weight, more preferably from 1 to 7% by weight, based in each case on the total weight of the equilibrate used.

In a preferred process variant, the second step is preferably carried out directly following the first step and in the same vessel as the first step.

In a further preferred process variant, the second step is carried out batchwise in another vessel, separate from the first process step.

In a further preferred process variant, the second step is carried out in another vessel, separate from the first process step, wherein the optionally neutralized equilibrate, water, acidic catalyst, optionally further organosilicon compounds and optionally alcohol obtained in the first step are fed continuously and the reaction product is continuously discharged.

In a further preferred process variant, the first process step and the second process step are carried out continuously, wherein both steps are carried out in mixed or flow-through containers which are directly linked to each other or may be separated by an intermediate container.

The second step of the process according to the invention is preferably carried out at a temperature of 10 to 150° C., more preferably 20 to 145° C., especially 30 to 90° C., and at a pressure of the surrounding atmosphere, i.e. approximately between 900 and 1100 hPa. If desired however, also higher or lower pressures can be applied. The batchwise process variant is preferably carried out under reflux and at a pressure of the surrounding atmosphere. The continuous process variant is preferably carried out in a vessel with reflux cooler preferably under reflux and at a pressure of the surrounding atmosphere or in a sealed vessel without reflux cooler preferably at temperatures of 5 to 10° C. below the reflux temperature and at a slight positive pressure.

The second step of the process according to the invention is preferably carried out for a duration of 5 to 250 min, more preferably 10 to 200 min, and especially 15 to 180 min. The duration depends on the catalyst used, the amount of catalyst used, the amount of water, the reaction temperature and the desired degree of condensation and can be adapted depending on the procedure; in the continuous process variant shorter times are advisable while in the batchwise process variant longer times are advisable for better reproducibility.

Following the reaction according to the invention, work-up or purification of the resulting reaction mixture can be carried out, for example by deactivation and devolatilization.

Deactivation is effected preferably using an excess of basic catalyst such that an HCl content of the mixture of 0 to 20 ppm is obtained. Examples are those mentioned for the basic equilibration catalyst, especially sodium methoxide and sodium ethoxide.

Optionally, prior to or during the devolatilization, further substances can be added which should be mixed with the branched organopolysiloxanes produced by the process according to the invention, such as solid silicone resins, acrylate monomers or methacrylate monomers.

During devolatilization, the resulting reaction mixture is freed from volatile constituents such as alcohols and water residues by maintaining the mixture at temperatures of preferably 30 to 120° C. and an absolute pressure of preferably 20 to 800 mbar. Preferably, the majority of the alcohol is firstly distilled off at standard pressure and a temperature in the range of 80 to 120° C. and then residual volatile constituents are removed at a pressure of 20 to 800 mbar.

The alcohol which is separated off during work-up can be reused, for example in the production of alkoxysilanes.

A major advantage of the process according to the invention is that the hydrolysis and condensation in the second step takes place without addition of hydrocarbons and only in the presence of the alcohol formed as reaction product.

The components used in the process according to the invention can each be one type of one such component as well as a mixture of at least two types of a relevant component.

The process according to the invention can be carried out in batchwise mode, semi-continuously or fully continuously.

The branched organopolysiloxanes produced by the process according to the invention comprising units of the formula (I) have average molecular weights Mw (weight average) of preferably 800 to 10,000 g/mol with a polydispersity (PD) of at most 10, preferably 900 to 8,000 g/mol with a polydispersity of at most 5, more preferably 1,000 to 5,000 g/mol with a polydispersity of at most 4, and especially 1,000 to 3,000 g/mol with a polydispersity of at most 3.0.

The weight average Mw of the end products produced in accordance with the invention comprising units of the formula (I) is preferably at least 1.1-fold of the weight average Mw of the equilibrate obtained after the first step, more preferably at least 1.2-fold, yet more preferably at least 1.3-fold, and especially at least 1.4-fold.

Since the end products produced in accordance with the invention can be both liquid and highly viscous or solid, they can spread over a very wide viscosity range. Preferably, they are organopolysiloxanes which at 20° C. and 1013 hPa, have a viscosity of preferably 600 to 100,000 mPas, more preferably 750 to 50,000 mPas and most preferably 1000 to 10,000 mPas, in each case at 25° C. and standard pressure.

The branched organopolysiloxanes produced by the process according to the invention comprising units of the formula (I) preferably have an alkoxy content of 2 to 20% by weight, more preferably 3 to 18% by weight, and especially 4 to 15% by weight.

The equilibrates or the end products produced according to the invention or preparations thereof can be used for producing composites as binders or as binder additives for interior or exterior use.

The branched organopolysiloxanes produced by the process according to the invention comprising units of the formula (I) can also be used for manipulating other properties of preparations or solids or films obtained therefrom:

controlling electrical conductivity and electrical resistance
controlling the leveling properties of a preparation
controlling the gloss of a moist or cured film or of an article
increasing weather resistance
increasing chemical resistance
increasing color tone stability
reducing the propensity to chalking
reducing or increasing the static or sliding friction on solid bodies or films
stabilizing or destabilizing foam in the preparation
improving the adhesion of the preparation and controlling the filler and pigment wetting and dispersing behavior,
controlling the rheological properties of the preparation,
controlling the mechanical properties such as flexibility, scratch resistance, elasticity, extensibility, bendability, tensile behavior, resilience, hardness, density, tear resistance, compression set, behavior at different temperatures, coefficient of expansion, abrasion resistance, and also further properties such as thermal conductivity, combustibility, gas permeability, resistance to water vapor, hot air, chemicals, weathering, and radiation, and sterilizability of solid bodies or films, controlling the electrical properties such as dielectric loss factor, dielectric strength, dielectric constant, tracking resistance, arc resistance, surface resistance, volume resistivity, flexibility, scratch resistance, elasticity, extensibility, bendability, tensile behavior, resilience, hardness, density, tear resistance, compression set, behavior at different temperatures of solid bodies or films.

Examples of applications in which the equilibrates or end products produced by the process according to the invention can be used in order to manipulate the properties referred to above are the production of coating materials and impregnations and coatings and coverings obtained therefrom on substrates such as metal, glass, wood, mineral substrate, synthetic and natural fibers for producing textiles, carpets, floor coverings, or other goods that may be produced from fibers, leather, plastics such as foils and moldings. The equilibrates or end products can be used in preparations, in the case of appropriate selection of the preparation components, also as an additive for the purpose of defoaming, flow promotion, hydrophobization, hydrophilization, filler and pigment dispersing, filler and pigment wetting, substrate wetting, promoting surface smoothness, reducing the adhesion and sliding resistance on the surface of the cured composition obtained from the preparation with additive.

The process according to the invention has the advantage that it is very simple to carry out and a very high conversion is achieved.

The process according to the invention has the advantage that branched polyorganosiloxanes of constant composition can be prepared reproducibly.

The process according to the invention has the advantage that it wholly does not require the use of hydrocarbons.

Furthermore, the process according to the invention has the advantage that no wastewater phase is generated, such as is the case, for example, in biphasic processes.

The process according to the invention in the first process step allows the degree of equilibration to be specifically adjusted from high to low such that it is suitable to provide monophasic polyorganosiloxanes.

The process according to the invention in the second process step allows the alkoxy content of the equilibrates to be specifically adjusted from high to low such that it is suitable to provide both low molecular weight and high molecular weight polyorganosiloxanes.

The process according to the invention has the advantage that it has a recovery rate of the alcohol released of at least 95%.

In addition, the process according to the invention has the advantage that it is particularly suitable for the controlled production of so-called DT, MDT, DQ, MDQ, DTQ and MDTQ resins.

In the present text, substances are characterized by providing data obtained by instrumental analysis. The underlying measurements are carried out either by following publicly available standards or determined by specifically developed methods. In order to ensure clarity of the teaching notified, the methods used are specified here:

Viscosity:

The viscosities are determined, unless otherwise stated, by rotational viscometric measurement in accordance with DIN EN ISO 3219. If not stated otherwise, all viscosity data apply at 25° C. and standard pressure of 1013 mbar.

Molecular Compositions:

The molecular compositions are determined by nuclear magnetic resonance spectroscopy (for terminology see ASTM E 386: High resolution nuclear magnetic resonance spectroscopy ($^1$H-NMR): terms and symbols), wherein the $^1$H nucleus and the $^{29}$Si nucleus is measured.

Description of $^1$H-NMR measurement

Solvent: $CDCl_3$, 99.8% d

Sample concentration: ca. 50 mg/1 ml $CDCl_3$ in 5 mm NMR tubes

Measurement without addition of TMS, spectrum referencing by residual $CHCl_3$ in $CDCl_3$ at 7.24 ppm Spectrometer: Bruker Avance I 500 or Bruker Avance HD 500

Sample probe: 5 mm BBO sample probe or SMART sample probe (Bruker)

Measurement parameters:

Pulse program=zg30

TD=64k

NS=64 or 128 (depending on the sensitivity of the sample probe)

SW=20.6 ppm

AQ=3.17 s

D1=5 s

SFO1=500.13 MHz

O1=6.175 ppm

Processing parameters:

SI=32 k

WDW=EM

LB=0.3 Hz

Depending on the type of spectrometer used, possible individual adjustments to the measurement parameters are required.

Description of $^{29}$Si-NMR measurement

Solvent: $C_6D_6$ 99.8% d/$CCl_4$ 1:1 v/v with 1% by weight Cr(acac)3 as relaxation reagent Sample concentration: ca. 2 g/1.5 ml of solvent in 10 mm NMR tubes Spectrometer: Bruker Avance 300

Sample probe: 10 mm 1H/13C/15N/29Si glass-free QNP sample probe (Bruker)

Measurement parameters:

Pulse program=zgig60

TD=64 k

NS=1024 (depending on the sensitivity of the sample probe)

SW=200 ppm

AQ=2.75 s

D1 =4 s

SFO1=300.13 MHz

O1=−50 ppm

Processing parameters:

SI=64 k

WDW=EM

LB=0.3 Hz

Depending on the type of spectrometer used, possible individual adjustments to the measurement parameters are required.

Molecular Weight Distributions:

Molecular weight distributions are determined as weight average Mw and as number average Mn, wherein the method used is gel permeation chromatography (GPC or Size Exclusion Chromatography(SEC)) using polystyrene as standard and refractive index detector (RI detector). Unless otherwise stated, THF is used as eluent and DIN 55672-1 applied. Polydispersity (PD) is the quotient Mw/Mn.

Acid Number (HCl Content):

10 ml of a solvent mixture composed of 3 liters of toluene and isopropanol with 12 ml of 0.024 g tetrabromophenol-phthalein ethyl ester in 96% ethanol, neutralized with 0.01N ethanolic HCl, are titrated with 0.01N ethanolic KOH with 3.00 g of the substance to be tested until the solution turns blue.

Ph signifies a phenyl radical
Me signifies a methyl radical

EXAMPLE 1

In a 2l glass flask equipped with reflux condenser, dropping funnel and KPG stirrer, 260 g of methyltrimethoxysilane, 576 g of phenyltriethoxysilane, 72 g of dihydroxy-terminated polydimethylsiloxane having a viscosity of 80 mPas and 1.0 g (4.6 mmol) of sodium methoxide solution (25% in methanol) are stirred at 100° C. for one hour, then acidified with 2.4 g of hydrochloric acid (20%), 86 g of water are added over the course of 15 minutes and the mixture is stirred at reflux for three hours.

The condensed, HCl-acidic end product thus formed is neutralized with a sodium methoxide solution (25% in methanol) and subsequently filtered.

The alcoholic end product solution is then distilled on a rotary evaporator at 100° C. oil bath temperature up to a final vacuum of 50 mbar, whereupon 418 g of distillate are obtained. This affords 568 g of a liquid and clear end product, which is defined by viscosity, alkoxy radical content and molecular weight distribution as follows:

Molecular composition by 29Si-NMR:
$Me_2SiO_{2/2}$: 19.5 mol %
$Me_2Si(OR')O_{1/2}$: 2.1 mol %,
$MeSi(OR')_2O_{1/2}$: 1.1 mol %,
$MeSi(OR')O_{2/2}$: 14.8 mol %,
$MeSiO_{3/2}+PhSiO_{1/2}$: 19.6 mol %,
$PhSi(OR')O_{2/2}$: 30.2 mol %,
$PhSiO_{3/2}$: 12.7 mol %,
R'=Et or OH
Composition by $^1$H-NMR:
Ethoxy content: 16.4% by weight,
Silanol content: 0.8% by weight,
$PhSiO_{3/2}$ content: 53.7% by weight,
$MeSiO_{3/2}$ content: 16.0% by weight,
$Me_2SiO_{2/2}$ content: 13.1% by weight,
Viscosity: 310 mm²/s
Mw: 8200 g/mol
Mn: 1900 g/mol
PD: 4.3.

EXAMPLE 2

In a 2l glass flask equipped with reflux condenser, dropping funnel and KPG stirrer, 260 g of methyltrimethoxysilane, 576 g of phenyltriethoxysilane, 72 g of dihydroxy-terminated polydimethylsiloxane having a viscosity of 80 mPas and 1.0 g (4.6 mmol) of sodium methoxide solution (25% in methanol) are stirred at 100° C. for one hour, then acidified with 2.4 g of hydrochloric acid (20%), 95 g of water are added over the course of 15 minutes and the mixture is stirred at reflux for one hour.

The condensed, HCl-acidic end product thus obtained is neutralized with a sodium methoxide solution (25% in methanol) and subsequently filtered.

Subsequently, to the alcoholic end product solution is added 200 g of a solid phenyl resin, commercially available from WACKER Chemie AG under the name SILRES® 604, the mixture distilled and a liquid and clear end product is obtained which is defined by viscosity, alkoxy radical content and molecular weight distribution as follows:

Molecular composition by 29Si-NMR:
$Me_2SiO_{2/2}$: 14.4 mol %
$Me_2Si(OEt)O_{1/2}$: 1.4 mol %
$MeSi(OEt)_2O_{1/2}$: 0.8 mol %,
$MeSi(OEt)O_{2/2}$: 14.3 mol %,
$MeSiO_{3/2}+PhSiO_{1/2}$: 24.2 mol %,
$PhSi(OEt)O_{2/2}$: 31.0 mol %,
$PhSiO_{3/2}$: 13.9 mol %,
Composition by $^1$H-NMR:
Ethoxy content: 12.1% by weight,
Silanol content: 1.1% by weight,
$PhSiO_{3/2}$ content: 57.0% by weight,
$MeSiO_{3/2}$ content: 19.5% by weight,
$Me_2SiO_{2/2}$ content: 10.3% by weight,
other product parameters:
Viscosity: 8930 mm²/s
Mw: 1660 g/mol
Mn: 1020 g/mol
PD: 1.6.

Comparative example 1

In a 2l glass flask equipped with reflux condenser, dropping funnel and KPG stirrer, 260 g of methyltrimethoxysilane, 576 g of phenyltriethoxysilane, 72 g of dihydroxy-terminated polydimethylsiloxane having a viscosity of 80 mPas and 1.6 g (8.7 mmol) of hydrochloric acid (20%) are stirred at 100° C. for one hour, then 86 g of water are added over the course of 15 minutes and the mixture stirred at reflux for three hours. The condensed, HCl-acidic end product thus obtained is neutralized with a sodium methoxide solution (25% in methanol) and subsequently filtered.

The alcoholic end product solution is then distilled and a liquid and cloudy end product is obtained which separates into phases over the course of days.

The invention claimed is:

1. A process for producing branched organopolysiloxanes, comprising:
in a first step, equilibrating at least one alkoxysilane with at least one polydiorganosiloxane in the presence of a basic catalyst, optionally in the presence of alcohol and
in a second step, hydrolyzing and condensing the equilibrate obtained in the first step with water and optionally other organosilicon compounds in the presence of an acidic catalyst and optionally alcohol,
wherein, in the second step, hydrocarbons are present in amounts of not more than 1% by weight, based on the amount of equilibrate, and wherein the alkoxysilanes have the formula $$R_nSi(OR^1)_{4-n} \quad (II)$$

where
R are the same or different and are monovalent, SiC-bonded, optionally substituted hydrocarbon radicals,
$R^1$ are the same or different and are hydrogen or hydrocarbon radicals having 1 to 4 carbon atoms, and
n is 1,
wherein the branched organopolysiloxanes are DT and/or MDT organopolysiloxanes.

2. The process of claim 1, wherein the polydiorganosiloxanes are linear or cyclic siloxanes consisting of units of the formula $$R_c(OR^2)_d SiO_{4-c-d/2} \quad (III)$$

wherein
R are the same or different and are monovalent, SiC-bonded, optionally substituted hydrocarbon radicals,
$R^2$ are the same or different and are hydrogen or a hydrocarbon radical having 1 to 4 carbon atoms,
c is equal to 2 or 3 and
d is equal to 0 or 1,
wherein the sum of c+d≤3 and c has the value 2 in at least 50% of all units of formula (I).

3. The process of claim 1, wherein in the second step, water is used in amounts of 0.3 mol to 0.6 mol, based on 1 mol of alkoxy groups of the alkoxysilanes of the formula (II).

4. The process of claim 2, wherein in the second step, water is used in amounts of 0.3 mol to 0.6 mol, based on 1 mol of alkoxy groups of the alkoxysilanes of the formula (II).

5. The process of claim 1, wherein further organosilicon compounds are used in the second step.

6. The process of claim 2, wherein further organosilicon compounds are used in the second step.

7. The process of claim 3, wherein further organosilicon compounds are used in the second step.

8. The process of claim 3, wherein the branched organopolysiloxanes are DT organopolysiloxanes.

9. The process of claim 3, wherein the acid catalyst is an acid selected from the group consisting of hydrochloric acid, hydrofluoric acid, sulfuric acid, nitric acid, perchloric acid, phosphoric acid, trifluoromethanesulfonic acid, fluorosulfonic acid, methylsulfonic acid, vinylphosphonic acid, n-octylphosphonic acid, trifluoroacetic acid, formic acid, oxalic acid, and n-octanoic acid, and/or compounds which in the presence of water and alcohols form acids, selected from the group consisting of isooctyltrichlorosilane, dichlorodimethylsilane, tetrachlorosilane, phosphorus oxychloride, acetyl chloride, n-octoyl chloride, sulfur trioxide, acetic anhydride, pyrosulfuric acid, pyrophosphoric acid, and mixtures thereof.

10. The process of claim 3, wherein the acid catalyst comprises hydrochloric acid.

* * * * *